US008175134B1

(12) United States Patent
Giallorenzi et al.

(10) Patent No.: US 8,175,134 B1
(45) Date of Patent: May 8, 2012

(54) RADIO COMMUNICATIONS SYSTEM AND METHOD HAVING DECREASED CAPABILITY FOR DETECTION BY AN ADVERSARY

(75) Inventors: Thomas R. Giallorenzi, Sandy, UT (US); Samuel C. Kingston, Salt Lake City, UT (US); Robert A. Wright, Sandy, UT (US)

(73) Assignee: L-3 Communications, Corp, New York, NY (US)

( * ) Notice: Subject to any disclaimer, the term of this patent is extended or adjusted under 35 U.S.C. 154(b) by 569 days.

(21) Appl. No.: 12/432,512

(22) Filed: Apr. 29, 2009

(51) Int. Cl.
*H04B 1/707* (2011.01)
(52) U.S. Cl. .......................... 375/140; 375/139; 375/132
(58) Field of Classification Search .................. 375/132, 375/133, 135, 136, 139, 140, 141, 146, 147
See application file for complete search history.

(56) References Cited

U.S. PATENT DOCUMENTS

| 4,037,159 | A | 7/1977 | Martin | |
|---|---|---|---|---|
| 5,084,901 | A | 1/1992 | Nagazumi | |
| 6,741,633 | B1 * | 5/2004 | Cangiani et al. | 375/132 |
| 7,215,698 | B2 * | 5/2007 | Darby et al. | 375/135 |
| 7,308,043 | B1 | 12/2007 | Frank | |
| 2003/0039300 | A1 | 2/2003 | Anglin, Jr. | |
| 2003/0133496 | A1 | 7/2003 | Hooton | |
| 2005/0018752 | A1 | 1/2005 | Anglin, Jr. | |
| 2006/0280227 | A1 | 12/2006 | Pinkney | |
| 2008/0019422 | A1 * | 1/2008 | Smith et al. | 375/136 |

* cited by examiner

*Primary Examiner* — Kevin Kim
(74) *Attorney, Agent, or Firm* — Kirton & McConkie; N. Kenneth Burraston

(57) ABSTRACT

Decreased capability for detection of communications signals by an adversary is provided by applying frequency hopping, frequency chirping, and direct sequence spreading to the signals. The frequency hopping and frequency chirping can be driven by pseudo random functions. The direct sequence spreading can use a pseudo random chip sequence.

29 Claims, 6 Drawing Sheets

RADIO COMMUNICATIONS SYSTEM AND METHOD HAVING DECREASED CAPABILITY FOR DETECTION BY AN ADVERSARY

FIELD

The present application relates to spread spectrum systems. More particularly, the present application relates to direct sequence spread spectrum systems providing decreased capability for detection by an adversary.

BACKGROUND

It is often desirable to prevent (or at least reduce the probability of) detection or reception of radio communications signals. A number of techniques for low probability of detection communication have been used and proposed over the years, although spread spectrum techniques have generally achieved the most success in this regard. In a spread spectrum system, a spreading code is used to greatly expand the bandwidth of transmitted signals. The transmitted signals thus have a relatively large bandwidth as compared to the bandwidth of information encoded into the transmitted signals. For intended receivers, the spreading code can be known, and thus can be removed once synchronization has been obtained. The process of removing the spreading code in the receiver can also provide benefits in reducing the effects of interference and/or jamming. For adversaries who lack knowledge of the spreading code, detection of and synchronization to the transmitted signal can be difficult. Jamming a spread spectrum signal can also be difficult, since without knowledge of the spreading code, the intended receiver gains an advantage over the would-be jammer.

Two different types of spread spectrum systems are frequently used: frequency hopping and direct sequence. In frequency hopping, the transmitted frequency is discontinuously changed (frequency hopped) at a regular interval. The spreading code is used to determine the frequency during each hopping (dwell) interval. In direct sequence spreading, the transmitted signal is directly modulated by a spreading code (chip sequence) which changes at a much faster rate than the data encoded into the signal. Various types of modulation can be used, including for example, phase shift keying and M-ary frequency shift keying.

Spread spectrum systems, however, have various vulnerabilities to different types of detectors. In particular, it can sometimes be possible for an adversary to reliably detect the presence of a spread spectrum transmission without knowing the code. When it is necessary or desirable for the presence of spread spectrum transmissions to be covert, such vulnerabilities are undesirable.

SUMMARY

Accordingly, the present inventors have developed techniques to decrease the capability for detection of a communications signal by an adversary.

In some embodiments of the invention, a method for radio communications having decreased capability for detection of communications signals by an adversary is provided. The method can include transmitting a signal having data encoded therein from a communications terminal. The signal can be chirped by changing the frequency of the signal using a chirp function. The chirp function can change the frequency of the signal in a substantially continuous manner during a dwell interval. The chirp function can be a pseudo random function, which changes each dwell interval. The signal can also be hopped by discontinuously changing the frequency of the signal between dwell intervals. The frequency hopping can be based on a pseudo random frequency selection. The signal can also be direct sequence spread using a pseudo random chip sequence.

In some embodiments of the invention, a method for receiving a direct sequence spread, frequency hopped and frequency chirped radio communications signal is provided. The method can include receiving a received signal having data encoded therein at a communications terminal. The received signal can be direct sequence despread using a pseudo random chip sequence. The received signal can also be mixed with a local oscillator signal to substantially remove frequency hopping and frequency chirping imposed on the received signal. The local oscillator signal can include frequency hopping between dwell intervals and frequency chirping during dwell intervals, wherein the frequency hopping and frequency chirping are based on one or more pseudo random functions. The received signal can be demodulated to extract the data.

In some embodiments of the invention, a transmitter for transmitting a direct sequence frequency hopped chirped radio communications signal is provided. A modulator can modulate data to form a modulated signal. A mixer can mix the modulated signal with a reference signal to form a frequency hopped and frequency chirped signal. The reference signal can be formed by a reference signal generator, which can generate a reference signal that includes frequency hopping between dwell intervals and frequency chirping during dwell intervals, wherein the frequency hopping and frequency chirping are based on a pseudo random functions. A spreader can be coupled to the mixer and direct sequence spread the frequency hopped and frequency chirped signal to form a transmit signal.

In some embodiments of the invention, a receiver for receiving a direct sequence frequency hopped chirped communications radio signal is provided. The receiver can include a despreader to despread a received signal to form a despread signal. A mixer can mix the despread signal with a reference signal to substantially remove frequency hopping and frequency chirping imposed on the received signal to form a dehopped signal. The reference signal can be formed by a reference signal generator, which can generate a reference signal that includes frequency hopping between dwell intervals and frequency chirping during dwell intervals, wherein the frequency hopping and frequency chirping are each based on a pseudo random function. A demodulator can demodulate data from the dehopped signal.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION

Figure 1:
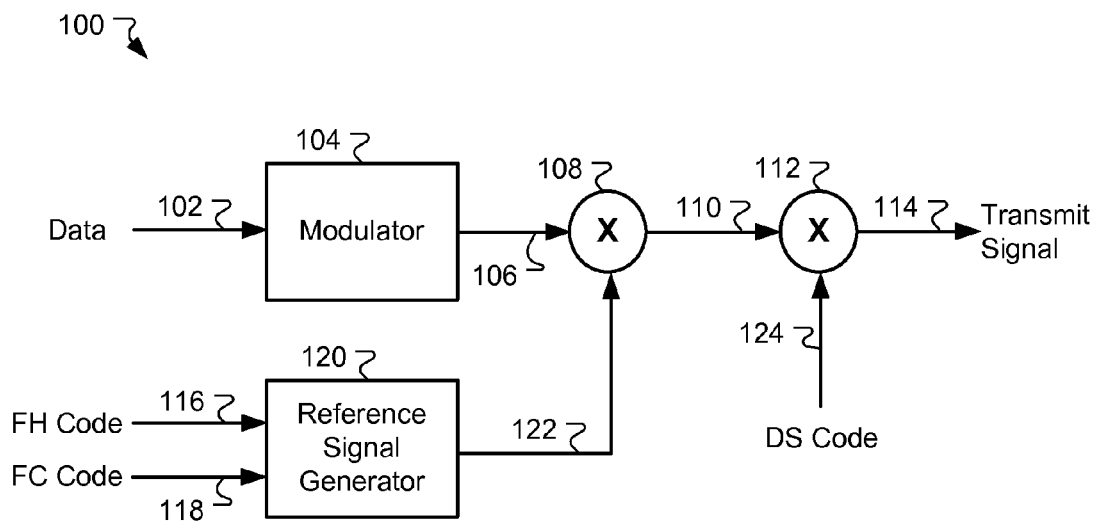
FIG. 1 is a block diagram of a transmitter for transmitting a direct sequence frequency hopped chirped signal in accordance with some embodiments of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used:

The singular forms "a," "an," and "the" include plural referents unless the context clearly dictates otherwise. Thus, for example, reference to a terminal includes reference to one or more terminals.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

By the term "substantially" is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. As a particular example, in a digital electronics systems, two clock edges can be substantially time coincident when they are generated or triggered by a common event. The clock edges may not, however, be precisely aligned, due to factors such as differing propagation delays in digital gates, clock jitter, noise, and similar factors. As another example, time synchronization of radio signals is dependent upon propagation delays, and thus synchronization can be dependent upon relative position of transmitters and receivers.

Numerical data may be expressed or presented herein in a range format. It is to be understood that such a range format is used merely for convenience and brevity and thus should be interpreted flexibly to include not only the numerical values explicitly recited as the limits of the range, but also as including all the individual numerical values or sub-ranges encompassed within that range as if each numerical value and sub-range is explicitly recited. As an illustration, a numerical range of "about 1 to 5" should be interpreted to include not only the explicitly recited values of about 1 to 5, but also include individual values and sub-ranges within the indicated range. Thus, included in this numerical range are individual values such as 2, 3, and 4 and sub-ranges such as 1-3, 2-4, and 3-5, etc. This same principle applies to ranges reciting only one numerical value and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items.

As used herein, the term "alternatively" refers to selection of one of two or more alternatives, and is not intended to limit the selection to only those listed alternatives unless the context clearly indicates otherwise.

As user herein, the term "signal" refers to an electronic signal within a communications system. A signal can be a radio frequency signal propagating in free space or substantially confined within a signal path (e.g., a coaxial cable, waveguide, printed circuit board trace, internal wiring within an integrated circuit etc.). A signal can also be a digital signal or analog signal on a signal path. Digital signals can also be stored within digital circuits, for example in the form of particular bit patterns within a register, latch, memory, or the like. Signals can be converted between formats (e.g., between digital and analog, between stored and propagating, etc.) using various techniques (e.g., digital to analog converters, analog to digital converters, input buffers, output buffers, direct memory access controllers, etc.).

As used herein, the term "data" refers to digital information. Data can be, for example, user data to be transmitted over a communications link. As another example, data can be a transformed version of data. For example, a forward error correction encoder can take user data and add redundancy to produce encoded data. The encoded data is different from the user data, however the user data can be extracted (decoded) from the encoded data. Data can include multiple different user data streams multiplexed together.

As used herein, the term "symbol" refers to a modulated (or demodulated) unit. Thus, a signal can have a symbol rate which corresponds to the rate at which some characteristic of the signal (e.g., phrase, frequency, amplitude) is changed to encode data onto the signal. A symbol can include multiple bits of data (e.g., a quadrature phase shift keying modulation symbol carries two bits). Data included in a symbol can be different from (although related to) user data, as it can have undergone various transformations, including for example, forward error correction coding.

As used herein, the term "chip" refers to a unit of a direct sequence spreading code. A chip can correspond to one bit of a pseudo random sequence (e.g., with binary spreading). A chip rate thus refers to a rate at which chips are generated or used.

As used herein, "message" refers to a quantity of data. For example, user data for transmission can be grouped into fixed or variable length packets of data for transmission during discrete, distinct intervals. Each transmission of a packet of data can be referred to as a message transmission.

As used herein, "preamble" refers to a portion of message transmission that is distinct from the user data portion of the message transmission. A preamble can be used, for example, to assist a receiver in synchronizing to the message transmission. Generally, a preamble is transmitted before the user data, but this is not essential, as a preamble can, alternatively or in addition, appear in the center or at the end of a message transmission. A preamble can include fixed symbol patterns (e.g., for use in correlation detection), variable symbol portions (e.g., information describing the communications parameters used for the user data portion), or both. Turning to the present invention, techniques for decreasing the capability for detection of a communications signal by an adversary have been developed by the present inventors. The techniques can be implemented in communications terminals, which can include one or more transmitters, one or more receivers, or combinations of a transmitter(s) and a receiver(s).

The techniques can include applying a combination of frequency hopping, frequency chirping, and direct sequence spreading to a transmitted signal. The frequency hopping, frequency chirping, and direct sequence spreading can be driven by pseudo random data (e.g., spreading codes). The addition of frequency chirping can be particularly effective against certain types of detectors. The frequency hopping and chirping can be synchronized or unsynchronized with the direct sequence spreading. The rate of the frequency hopping and chirping can be fast or slow relative to the length of message transmissions.

The intervals between which the transmitted signal is frequency hopped do not have to be constant, and the rate at which the transmitted signal is frequency chirped also does not have to be constant. Accordingly, detection of the transmitted signal by an adversary who does not know beforehand the timing of the frequency hopping or the amounts of frequency hopping and frequency chirping is greatly complicated.

The direct sequence spreading, frequency chirping, and frequency hopping can be removed at a receiver that knows the codes used to generate the spreading, chirping, and hopping. Various synchronization schemes can be used.

Turning to FIG. 1, a block diagram of a transmitter for transmitting a direct sequence frequency hopped chirped signal is illustrated in accordance with some embodiments of the present invention. The transmitter 100 can include a modulator 104 that accepts data 102. The data can be provided, for example by an external system, by a user, or from other sources, and can be data that is to be transmitted through a communications system. The data can modulated to form a modulated signal 106. For example, the data can be converted into a modulated form. As another example, the data can be modulated onto a carrier signal. Various modulation formats can be used, including without limitation, phase shift modulation, frequency shift modulation, amplitude shift modulation, and combinations thereof. The modulator can be implemented digitally, using various components, including for example, a field programmable gate array (FPGA), application specific integrated circuit (ASIC), software executing within a digital signal processor (DSP), or software executing within a general purpose microprocessor. The modulated signal can be in the form of a digital signal (e.g., a quantized, digital data stream). As another example, the modulated signal can be stored as digital data in a processor memory for subsequent operation s. As another example, the modulator can include a digital to analog converter and provide the modulated signal as an analog signal.

The modulated signal 106 can have frequency hopping and frequency chirping applied, for example by a mixer 108. A reference signal generator 120 can generate a reference signal 122 which includes frequency hopping and frequency chirping to be imposed onto the transmit signal. Various ways of implementing the reference signal generator can be used. For example, the reference signal generator can be implemented digitally, as described above. As another example, the reference signal generator can be implemented using a mixture of digital and analog components (e.g., a direct digital synthesizer). The frequency hopping and frequency chirping can be derived from a frequency hopping (FH) code 116 and frequency chirping (FC) code 118. Although separate frequency hopping and frequency chirping codes are shown, the frequency hopping and frequency chirping can be derived from a common code if desired. Further detailed examples of some embodiments of frequency hopping and frequency chirping are provided below. The modulated signal and the reference signal can be mixed together in the (first) mixer 108 to form a hopped chirped signal 110 that has both frequency hopping and frequency chirping.

Direct sequence spreading can also be applied. The hopped chirped signal 110 can be mixed with a direct sequence (DS) spreading code 124 in a (second mixer) 112 to direct sequence spread the hopped chirped signal to form a transmit signal 114. The direct sequence spreading code can, for example, be generated by a code generator (not shown) using various techniques.

The first mixer 108 and the second mixer 112 can be implemented in various ways. For example, mixing can be performed by digital operations (e.g., multiplication, logical exclusive-or, and similar function) implemented in digital circuitry. As another example, mixing can be performed by analog components (e.g., multipliers, mixers, and the like). The transmit signal can be further processed by upconverters, amplifiers, antennas, and similar components (not shown) to form a radio signal for radio transmission.

The frequency hopping code 116, frequency chirping code 118, and direct sequence code 124 can all be based on pseudo random functions. For example, a pseudo noise generator (not shown) can be used to generate a sequence of pseudo random numbers (e.g., binary chips) which are used either directly or indirectly (e.g., as indices into a lookup table). As another example, the pseudo random sequence can be used directly as the DS code to create direct sequence spreading in the second mixer 112. As another example, the pseudo random sequence can be used indirectly, for example, to access a lookup table defining particular frequency hop or frequency chirp to generate in the reference signal generator 120. The same pseudo random sequence can be used to drive both the frequency hopping and frequency chirping, or alternatively, a different pseudo random sequences can be used for the frequency hopping and frequency chirping.

The chirping and hopping need not be constant, and improved covertness can be obtained by providing a large range of possible hopping (e.g., wide bandwidth over which the signal is hopped) and the large range of possible chirping (e.g., the rate at which frequency is changed for linear chirps. In some embodiments, frequency hopping can be defined by a range of frequencies, wherein a particular frequency within the range is selected based on the pseudo random sequence. In some embodiments, frequency chirping can be defined by a range of frequency change rates, wherein a particular frequency change rate is selected based on the pseudo random sequence.

Figure 2:
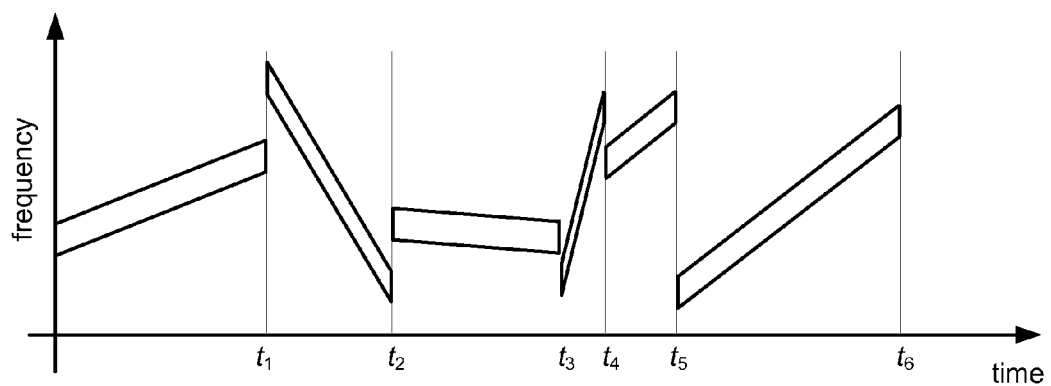
FIG. 2 is a time versus frequency illustration of a hopped chirped signal in accordance with some embodiments of the present invention.

FIG. 2 provides an illustration of a hopped chirped signal in accordance with some embodiments of the invention. The signal frequency is shown on the vertical (Y) axis as a function of time on the horizontal (X) axis. A number of dwell intervals are shown, with boundaries between intervals designated $t_1$, $t_2$, $t_3$ etc. During a dwell interval, the signal frequency can be chirped (e.g., continuously changed), for example, decreasing in frequency with time between $t_1$ to $t_2$ and increasing in frequency between $t_5$ and $t_6$. Between the dwell intervals, the frequency can be hopped (e.g., discontinuously changed). The amount of frequency hop and frequency chirp need not be constant. Accordingly, for each dwell interval, the amount (and direction) of frequency chirp and the amount (and direction) of frequency hop (or, equivalently, the starting frequency of the frequency chirp) can be determined based on the frequency hop code and frequency chirp code. In other words, the slope of the frequency chirp can be pseudo randomly selected each dwell interval.

The frequency chirping shown in FIG. 2 is linear, but this is not essential. If desired, the frequency chirping can be nonlinear. For example, the frequency as a function of time can be a nonlinear function wherein a parameter of the nonlinear function can be pseudo randomly selected for each dwell interval. For Example, FIG. 9, described in detail further below, provides an example of frequency chirping using a non-linear function. In some embodiments, the frequency of the signal f can be defined by a polynomial in time, wherein one or more of the coefficients are varied on a pseudo random basis each dwell interval, e.g., $f=a_0(t)+a_1(t)t+a_2(t)t^2+a_3(t)t^3+a_4(t)t^4+\ldots$, wherein t is the time (e.g., ranging from 0 to 1 over the dwell interval), and $a_0, a_1, \ldots$ are coefficients (fixed or varying as a function of t), and f is the resulting frequency. Note that the term $a_0$ can be used to define a frequency hop by selecting a different $a_0$ for each dwell interval. Coefficients can be determined by the pseudo random code sequence (e.g., using the pseudo random code sequence directly or indirectly). In some embodiments, the frequency chirp can be defined by the derivatives of the frequency chirping.

In addition, as illustrated in FIG. 2, the dwell interval need not be constant. Accordingly, the length of each dwell interval can also be pseudo randomly selected. For example, a pseudo random sequence can be generated and selected portions of the pseudo random sequence used to define each of the dwell interval length, frequency hop between dwell intervals, and frequency chirp for each dwell interval. Rules describing how the pseudo random sequence is used to define the dwell interval, frequency hop, frequency chip (and direct sequence spreading) can be predefined and known by both the transmitter and desired receivers.

The signal illustrated in FIG. 2 has been shown as having a bandwidth (vertical width). This bandwidth corresponds to the modulation bandwidth of the hopped chirped signal. It will be appreciated, however, that a transmit signal (having hopping, chirping, and direct sequence spreading) will appear somewhat similar when the direct sequence spreading bandwidth is relatively small compared to the bandwidth of the frequency hopping and chirping. If desired, the direct sequence spreading bandwidth can be much larger than the hopping and chirping bandwidth, however, in which case the frequency hopping and chirping may be less distinct in appearance.

Returning to FIG. 1, although spreading is shown as being applied before the frequency hopping and chirping, the invention is not limited to this order. For example, FIG. 1 can be modified (not shown) to exchange the order of the first mixer 108 and the second mixer 112, so that the spreading is applied first to the modulated data 106 to form a modulated spread signal. The modulated spread signal can then be mixed with the reference signal 122 to form the transmit signal 114 having spreading, hopping, and chirping.

Figure 3:
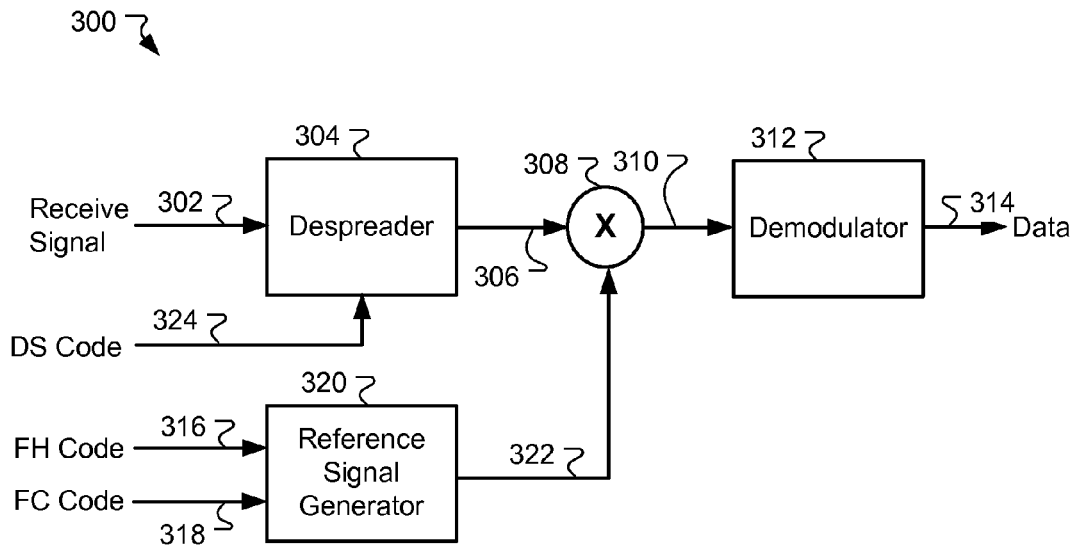
FIG. 3 is a block diagram of a receiver for receiving a direct sequence frequency hopped chirped communication signal in accordance with some embodiments of the present invention.

A receiver for receiving a direct sequence frequency hopped chirped communication signal is illustrated in FIG. 3 in accordance with some embodiments of the invention. The receiver can, for example, be used for receiving transmission from the transmitter of FIG. 1. The receiver 300 can accept a receive signal 302. The receive signal can be, for example a transmit signal from a transmitter like that of FIG. 1 that has been received through a wireless link. It will be appreciated that the receive signal can also include noise, jamming, and interference in addition to the transmit signal. The receive signal can be processed by antennas, amplifiers, downconverters, and similar components (not shown) to convert a receive radio signal. A despreader 304 can despread the received signal using a direct sequence spreading code 304 to form a despread signal 306. The despreader can be, for example, a mixer. The mixer can accept a direct sequence spreading code 324 properly time synchronized with the received signal. As another example, the despreader can include a correlator and circuitry to find synchronization between the local direct sequence spreading code and the received signal. When the despreader is properly synchronized to the received signal, the despread signal can have the direct sequence spreading substantially removed. The despreader can be implemented digitally, for example, as described above. As another example, the despreader can be implemented using analog components.

A reference signal generator 320 can generate a reference signal 322 in a similar manner as described above for the reference signal generator 120 of the transmitter 100 (FIG. 1), and can be implemented using similar components. The frequency hopping and frequency chirping can be derived from a frequency hopping code 316 and frequency chirping code 318, although the frequency hopping and frequency chirping can be derived from a common code if desired as described above. The reference signal can have frequency hopping and frequency chirping of the types as described above (e.g., linear chirp, nonlinear chirp, variable dwell interval, etc.).

The despread signal 306 and the reference signal 122 can be mixed together in a mixer 308 to form a dehopped signal 310. If the reference signal is synchronized to the frequency hopping and frequency chirping imposed on the received signal, the dehopped signal can have the frequency hopping and frequency chirping substantially removed. The mixer 308 can be similar to the mixer 108 (FIG. 1) described above.

The dehopped signal 310 can be processed by a demodulator 312 to extract data 314 that has been modulated onto the received signal. The demodulator can be implemented digitally, for example, as described above. Alternatively, the demodulator can be implemented in analog components. The demodulator can include matched filtering, phase tracking loops, symbol time tracking loops, automatic gain control, code tracking loops, and similar functions (not shown). The order of despreading and dehopping/dechirping in the receiver 300 can be reversed, similarly as described above for the transmitter 100 (FIG. 1). Thus, the despreader 304 and mixer 308 can be interchanged, so that a receive signal is first mixed with the reference signal 322 to remove frequency/hopping chirping, and then passed through the despreader 302 to form the dehopped signal 310.

A communications terminal can include both a transmitter 100 and a receiver 300. If desired, some components of the transmitter and receiver can be shared. For example, the reference signal generator can be shared between a transmitter and receiver if the frequency hopping and frequency chirping are synchronized between transmission and reception.

Figure 4:
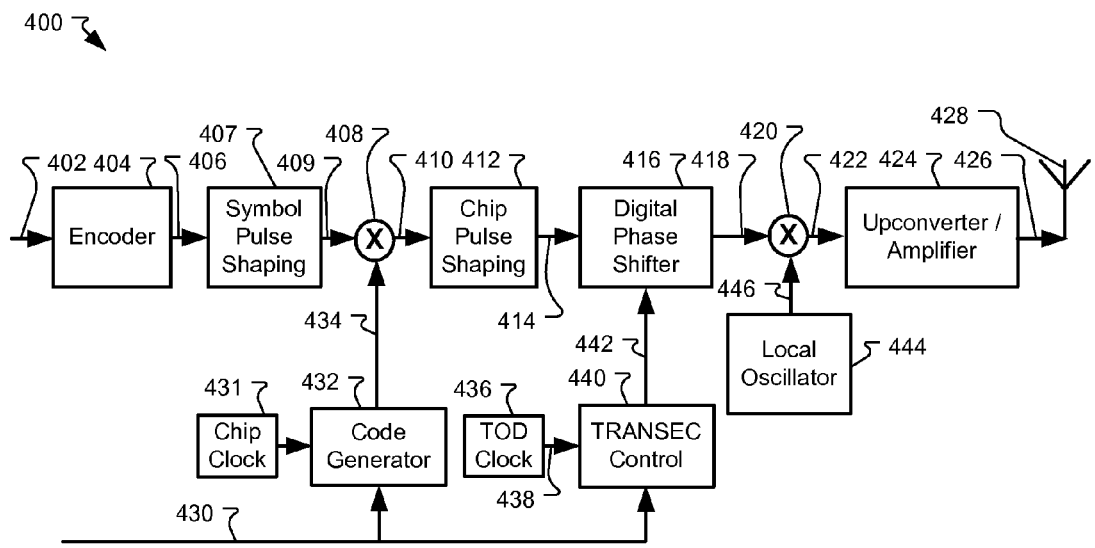
FIG. 4 is a detailed block diagram of an alternate arrangement of a transmitter for transmitting a direct sequence frequency hopped chirped signal in accordance with some embodiments of the present invention.

If desired, differing clock sources can be used for the hopping, chirping, and/or direct sequence spreading. For example, the hopping and chirping can be synchronized to time of day, while the direct sequence spreading can be synchronized to a free running clock asynchronous to the time of day clock. FIG. 4 provides a detailed block diagram of an alternate arrangement of a transmitter using such a synchronization scheme in accordance with some embodiments of the invention. The transmitter 400 accepts data 402 for transmission, which can be supplied to an encoder 404, which outputs encoded data 406. For example, the encoder can perform forward error correction encoding (e.g., convolutional coding, block coding, low-density parity check coding, turbo coding), interleaving, checksums, and similar functions. The encoded data can go through a symbol pulse-shaping filter 407 to produce shaped signal 409. The shaped signal can be direct sequence spread by applying a spreading code 434 to form spread signal 410. For example, the encoded data can be multiplied by the spreading code in a multiplier 408. For binary data, the multiplier can be a logical exclusive-or. The spreading code can be generated by a code generator 432, which can be clocked by chip clock 431. The code generator can be provided key data 430 to define a pseudo random spreading code sequence.

The spread signal 410 can then be run through a pulse-shaping filter 412 to provide desired spectral characteristics to yield filtered signal 414. Pulse shaping can, for example, be applied to control bandwidth of the signal.

Frequency hopping and frequency chirping can be applied to the filtered signal 414 using a digital phase shifter 416 to form a hopped chirped signal 418. The digital phase shifter can be provided phase/frequency shift information 442 from a TRANSEC control 440. The TRANSEC control can use time of day 438 provided by a time of day (TOD) clock 436 to generate the phase/frequency shift information.

The hopped chirped signal 418 can be mixed with a local oscillator signal 446 using mixer 420 to form an intermediate frequency signal 422. The mixing can be driven by local oscillator 444. The local oscillator and mixer can be implemented digitally (and a digital to analog converter, not shown, included after the mixer). Alternatively, the local oscillator and mixer can be implemented in analog components (and a digital to analog converter, not shown, included between the digital phase shifter and the mixer).

The intermediate frequency signal 422 can then be further upconverted and amplified using upconverter/amplifier 424 to form a radio signal 426, which can be transmitted by an antenna 428. Various modules can be included in the transmitter, including for example, filtering, gain control, power supplies, and similar functions (not shown).

By driving the frequency hopping/chirping from a different clock than the direct sequence spreading, improved covertness can be obtained. This is because, on one hand, the hopping/chirping tends to disrupt the ability some types of direct sequence signal detectors to be able to detect the signal. By decoupling the frequency hopping/chirping from the direct sequence spreading, the ability of an adversary to find synchronization to either the hopping/chirping or the direct sequence spreading is complicated by the presence of the other, and independent searching in each of these aspects appears necessary. In contrast, for an intended user having the keys, synchronization can more easily be obtained.

In some embodiments, the transmitter 400 can include both digital and analog components. For example, the digital phase shifter 416 and components below and to the left (encoding 404, symbol pulse shaping 407, mixer 408, chip pulse shaping 412, spreading code generator 432, and TRANSEC control 440) can be implemented substantially entirely in digital hardware, such as one or more field programmable gate arrays, application specific integrated circuits, or similar components. Digital signals can be converted to analog signals using a digital to analog converter (e.g., included in the digital phase shifter or disposed right after the digital phase shifter). The mixer 420, upconverter 424, and antenna 428 can operate primarily on analog format signals.

Figure 5:
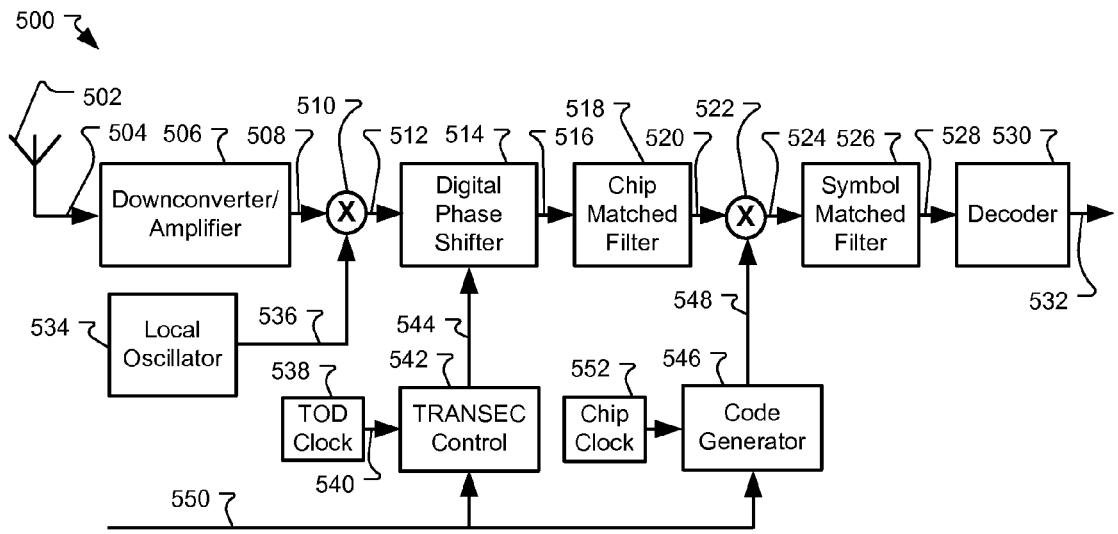
FIG. 5 is a detailed block diagram of an alternate arrangement of a receiver for receiving a direct sequence frequency hopped chirped signal in accordance with some embodiments of the present invention.

In some embodiments, reception of the radio signal 426 generated by the transmitter 400 can be performed using a receiver such as illustrated in FIG. 5 in accordance with some embodiments of the present invention. The receiver 500 can receive a radio signal 504 using an antenna 502. The radio signal can be processed by a downconverter/amplifier 506 to provide an intermediate frequency signal 508. The downconverter can include modulates such as amplifiers, filtering, gain control, power supplies, and similar functions (not shown).

The intermediate frequency signal 508 can be mixed with a local oscillator signal 536 using a mixer 510 to provide a baseband signal 512. The local oscillator signal can be generated by a local oscillator 534 in a similar manner as described above for the transmitter 400 (FIG. 4).

The baseband signal 512 can include direct sequence spreading, frequency hopping, and frequency chirping imposed by the transmitter. The frequency hopping and chirping can be substantially removed by a digital phase shifter 514 to produce spread signal 516. The digital phase shifter can be provided frequency information 544 from a TRANSEC control 542. The TRANSEC control can be driven by the same key 550 as the transmitter 400 (FIG. 4). The time of day information 540 can be provided by a time of day (TOD) clock 538. Provided that the transmitter and receiver have adequately synchronized time of day clocks (as discussed further below), the digital phase shifter can substantially remove the hopping and chirping.

The spread signal 516 can be passed through a chip matched filter 518 (e.g., matched to the pulse shaping filter 412 of the transmitter 400), and the resulting signal 520 despread using a mixer 522. The despreading can use a spreading code 548 generated by a code generator 546. The spreading code generator can be driven a chip clock 552 that is unsynchronized to the time of day clock 538. Alignment of the chip clock to the chip timing of the received signal can be performed using techniques such as sliding correlation and the like. The spreading code generator can also provide key 550 information.

The resulting despread signal 524 can be passed to a symbol matched filter 526 that integrates over a number spreading code chips to extracted encoded data 528, which can be passed to decoder 540 which extracts data 532. The decoder can perform functions complementary to the encoder 404 of the transmitter 400 (FIG. 4). For example, the decoder can perform Viterbi decoding, turbo decoding, block decoding, deinterleaving, parity check, checksum check, and similar functions.

Implementation of the receiver 500 can use similar techniques as for the transmitter 400, as described above, including for example, a mixture of digital and analog circuitry.

Figure 6:
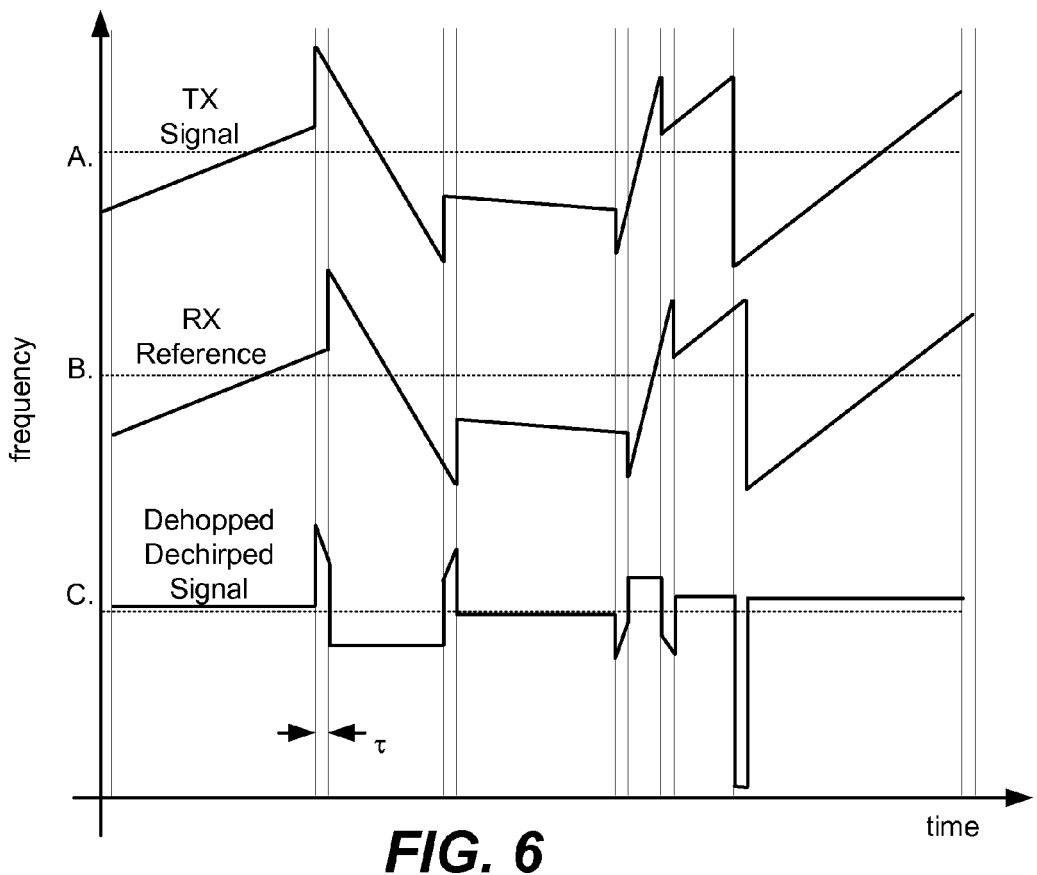
FIG. 6 is a frequency versus time plot of one example of a transmitted signal, a reference signal in a receiver, and a dehopped dechirped signal in accordance with some embodiments of the present invention.

Operation of the transmitter 400 and receiver 500 is illustrated further by a signal time diagram illustrated in FIG. 6, which provides plots of several signals in accordance with some embodiments of the invention. A transmitted signal (line A) can have frequency hopping and chirping applied using any of the techniques described above. The transmitted signal can be generated, for example, by the transmitter 100 of FIG. 1 or the transmitter 400 of FIG. 4. The transmitted signal can be received at a receiver, for example, the receiver 300 of FIG. 3 or the receiver 500 of FIG. 5. The second line (line B) illustrates a reference signal (e.g., reference signal 322 of FIG. 3 or frequency information 544 of FIG. 5). The reference signal can be seen to have substantially the same frequency hopping and frequency chirping as the received signal (although slightly offset in time). Thus, by mixing the reference signal with the received signal (e.g., taking the difference component), the frequency hopping and frequency chirping can be substantially removed.

FIG. 6 illustrates a slight time difference τ between the timing of the transmitter and the receiver. For example, small errors in the accuracy of the time of day clocks can result in such an error. As another example, propagation delay between the transmitter and receiver can also result in such an error. Of course, the amount of timing difference can be zero (or negligible) if the transmitter and receiver are perfectly (or closely) aligned. When this timing difference is present, the frequency of the reference signal is not exactly equal to the frequency of the received signal. Accordingly, as shown in the last line (line C) the dehopped dechirped signal can have a small, relatively constant residual frequency error during the major portion of the dwell interval, and large discontinuities near the ends of the dwell intervals at the boundaries between dwell intervals (i.e., during the time uncertainty interval). The discontinuities are due to the large frequency error caused by the frequency hops at the dwell intervals, and can result in large residual frequency errors. The large frequency errors can cause inability of the receiver to correctly decode data during this interval (due to large frequency error, large frequency chirp, or both), and can be managed in several ways. For example, a guard time can be included in the signal so that no data is transmitted near the boundaries of the dwell intervals so that no data is lost during these discontinuities. The guard time can therefore be about the same as the expected timing differences expected in the communications system (e.g., a maximum propagation delay, a maximum time of day clock error, combinations of both, or similar factors). Alternatively, sufficient forward error correction coding or other redundancy can be included so that loss of data during these discontinuities is small. For example, where the discontinuities are on the order of a few symbols (e.g., one, two, or less than ten) and occur infrequently separated by many symbols (e.g., hundreds, or thousands, or more) suitable forward error correction techniques can mitigate the effects of these loss symbols.

The small residual frequency errors in the dehopped dechirped signal during the main portion of the dwell intervals is due to the small timing difference in the chirps of the transmitter and receiver, and can be managed by the receiver. For example, the digital phase shifter 514 can include a phase tracking loop to track slowly varying phase changes caused by the small residual frequency error (and other factors, including for example Doppler, range variation, timing drift between transmitter and receiver, frequency reference errors, and similar effects). The amount of residual frequency error that can be handled by the receiver can be used to determine maximum frequency chirp rates as a function of time uncertainty. For example, for linear chirp rate of a Hz/sec, the residual frequency error is equal to àτ Hz, wherein τ is the time uncertainty in seconds. Accordingly, the chirp rate can be limited to ensure that the tracking capability of the receiver is not exceeded. Alternatively, the receiver can be designed to track a particular amount of frequency error corresponding to the maximum frequency error expected.

As mentioned above, the frequency hopping and frequency chirping can be fast or slow relative to message transmission lengths. For example, in some embodiments, a dwell interval can correspond to an entire message transmission. Thus, each message transmission can begin with a frequency hop, and have a frequency chirp during the message transmission. In such a situation, guard time at the beginning and end of the message can be provided to accommodate timing synchronization errors between the transmitter and receiver.

Alternatively, in some embodiments, a message transmission can span several dwell intervals. During each dwell interval, a number of symbols of the message can be transmitted.

For example, for very fast hopping, just a few symbols (e.g., 1, 2, or more) can be transmitted during each dwell interval. Alternatively, for slow hopping, many symbols (e.g., tens or hundreds) can be transmitted during each dwell interval.

Figure 7:
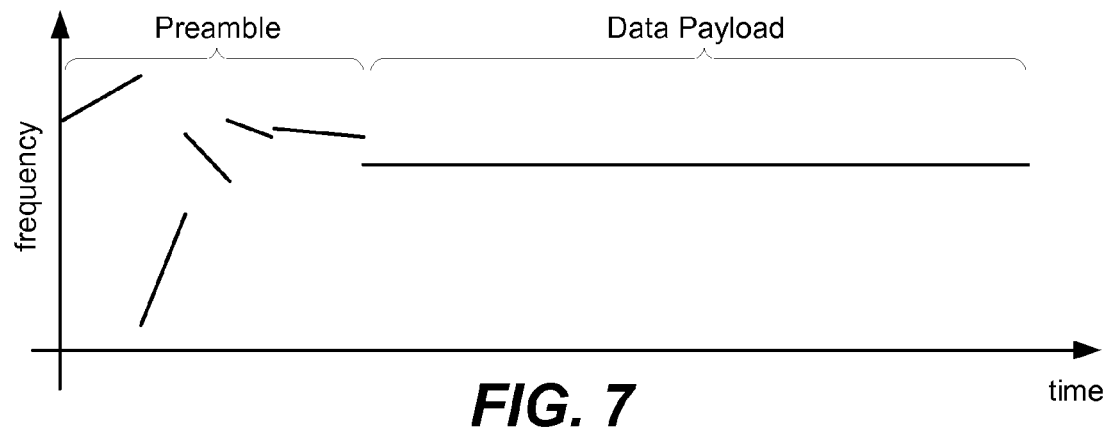
FIG. 7 is frequency versus time plot of one another example of a frequency hopped and frequency chirped signal in accordance with some embodiments of the present invention.
Figure 8:
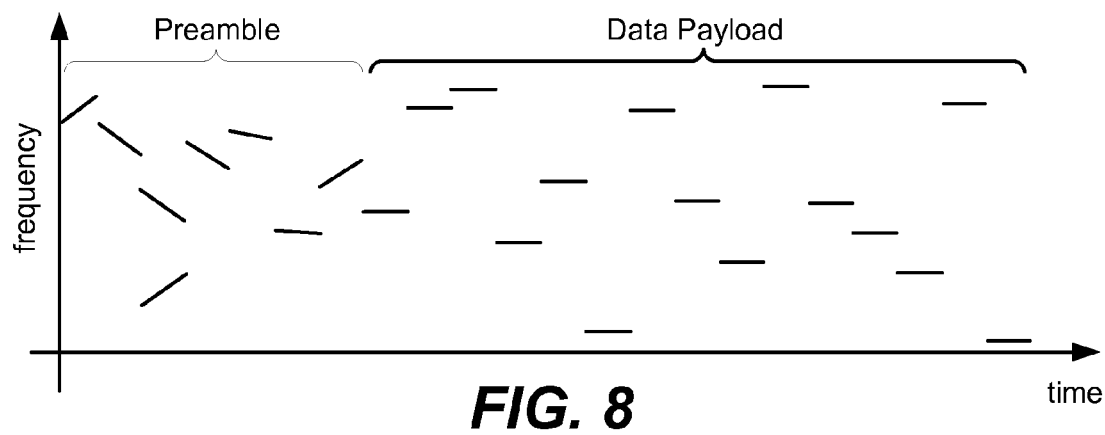
FIG. 8 is frequency versus time plot of one another example of a frequency hopped and frequency chirped signal in accordance with some embodiments of the present invention.

In some embodiments, frequency hopping and chirping can be applied to only portions of the message transmission. For example, messages can include a predefined (or partially predefined) preamble portion followed by a data payload. Frequency hopping and chirping may be performed during the preamble portion, and spreading only may be performed during the data payload. FIG. 7 provides a timing diagram of an example of a message transmission having frequency hopping and chirping only during the preamble portion. This approach can be helpful in making detection of message transmissions more difficult for an adversary, while reducing the potential for loss of data due to timing synchronization errors. In some embodiments, frequency hopping may be performed throughout the message transmission, and frequency chirping performed during only a portion of the message transmission. For example, FIG. 8 provides a timing diagram of an example of a message transmission having frequency hopping throughout the message and frequency chirping only during the preamble portion. Direct sequence spreading can be applied during the preamble portion only, during the data payload portion only, or throughout the entire message transmission. Of course, many other combinations are also possible, and different portions of the message can include different combinations of chirping, hopping, and direct sequence spreading.

Figure 9:
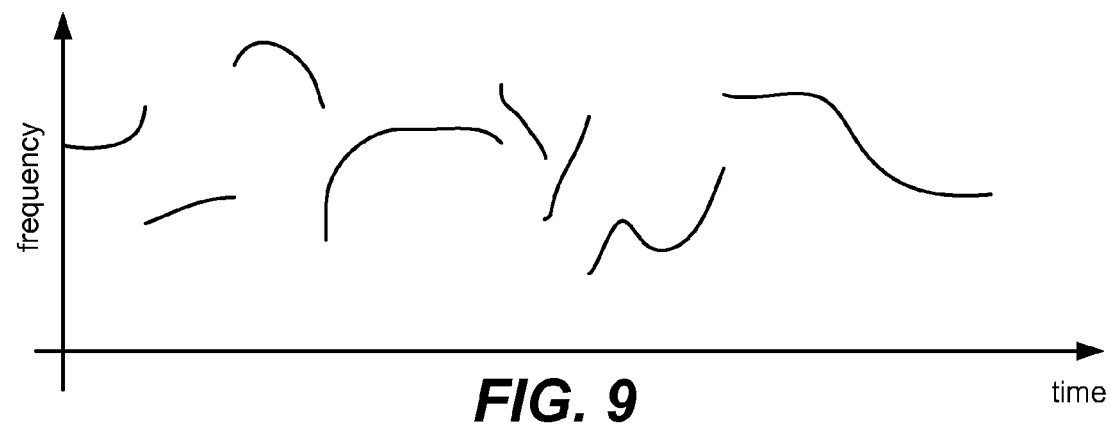
FIG. 9 is frequency versus time plot of one another example of a frequency hopped and frequency chirped signal in accordance with some embodiments of the present invention.

Although the foregoing examples have been primarily illustrated using linear frequency chirp, as mentioned above the frequency chirp can be a non-linear function. For example, FIG. 9 illustrates an example of a non-linear chirp. Various ways of generating a non-linear chirp can be used, for example, as described above.

Figure 10:
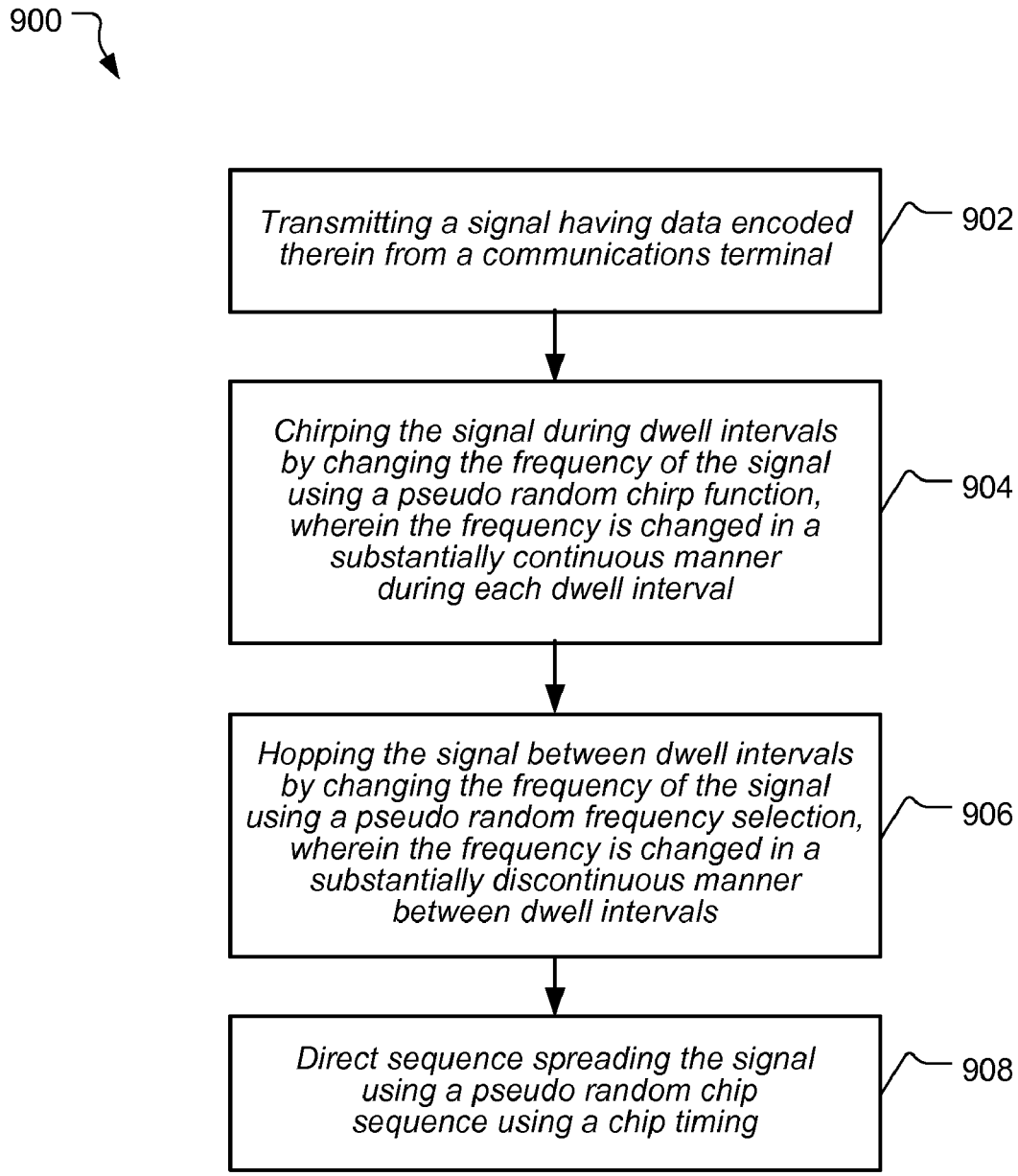
FIG. 10 is a flow chart of a method for transmission of radio communication having decreased capability for detection of a communications system by an adversary in accordance with some embodiments of the present invention.

FIG. 10 illustrates a flow chart of a method for transmission having decreased capability for detection of a communications system by an adversary. The method can be implemented in the transmitter of a communications terminal. The method can include, for example, performing operations to generate a physical radio signal for transmission from the terminals. The radio signal can, for example, be an electromagnetic wave propagated from an antenna. Data to be encoded can be transferred into or out of the terminal by data sources and/or data sinks (e.g., computers, data processing equipment, users via electronic interfaces, etc.). Data can be represented by electronic signals (e.g., computer data, digital logic signals, electronic voltages, currents, etc.). Data can be representative of physical objects, including for example sensor measurements of physical parameters, photographs of areas under observation.

Operations of the method can be implemented in digital hardware, software executing on a processor, analog components, and similar components, for example as described above. Operations of the method can including transforming an electronic signal from one form into another (e.g., converting digital data into an analog signal and vice versa, encoding data onto a radio frequency signal and vice versa, etc.).

The method 900 can include transmitting 902 a signal having data encoded therein from a communication terminal. The communication terminal can, for example, include a transmitter as described above. Transmission can include upconverting, filtering, amplifying, radiating, and similar operations, applied by, for example, upconverters, filters, amplifiers, antennas, and similar components.

Another operation in the method 900 can be chirping 904 the signal during dwell intervals by changing the frequency of the signal using a pseudo random chirp function. The frequency of the signal can be changed in a substantially continuous manner during each dwell interval. The pseudo random chirp function can be randomly selected by selecting parameters of the pseudo random chirp function using a pseudo random sequence as described above. For example, the pseudo random chirp function can be a linear chirp (e.g., frequency changes at a constant rate versus time) wherein the frequency change rate is pseudo randomly selected, for example as described above. The frequency change rate can be limited within a range (e.g., plus or minus 30 kHz). As another example, the pseudo random chirp function can be a non-linear function where a parameter of the pseudo random chirp function is pseudo randomly selected, for example as described above.

The method 900 can also include hopping 906 the signal between dwell intervals by changing the frequency of the signal in a substantially discontinuous manner between each dwell interval. The frequency of the signal can be changed using a pseudo random frequency selection. For example, the pseudo random frequency selection can selected from one of a plurality of predefined frequencies covering a bandwidth, wherein the selection is based on a pseudo random sequence. Frequency chirping and frequency hopping can be generated using a reference signal generator and applied to the signal by mixing, for example, as described above. As another example, frequency chirping and frequency hopping can be generated and applied to the signal using a digital phase shifter, for example, as described above. The dwell intervals need not all have the same length. The dwell intervals can each have a pseudo randomly selected length, for example, as described above.

Another operation in the method 900 can be direct sequence spreading 908 the signal using a pseudo random chip sequence. Direct sequence spreading can be applied using a spreader, exclusive-or logic, or a mixer, for example as described above. The pseudo random chip sequence can have a chip timing that is not synchronized to the dwell interval timing. The dwell interval timing can be tied to time of day and the pseudo random chip sequence tied to a clock asynchronous to time of day, for example as described above.

Although the operations in the method 900 are listed in a particular order, it will be appreciated that the operations need not occur in the listed order. Thus, the signal can be chirped, hopped, and then direct sequence spread. Alternatively, the signal can be direct sequence spread first, and then chirped and hopped. Chirping and hopping can occur simultaneously, for example, as illustrated above in FIGS. 1 and 3-4. Alternatively, chirping and hopping can be applied separately. For example, frequency chirping can be applied in a digital domain using a digital phase shifter and frequency hopping can be applied in an analog domain using a reference signal generator and a mixer. Direct sequence spreading can occur before or after frequency hopping and frequency chirping.

Reception of a signal transmitted by the method 900 can also be performed as will now be described. Reception can include receiving the signal at a second communications terminal and substantially removing the frequency hopping and the frequency chirping. Frequency chirping and frequency hopping can be removed by mixing a received signal with a signal generated from a reference signal generator, for example, as described above. As another example, frequency chirping and frequency hopping can be removed from the signal using a digital phase shifter, for example, as described above. Spreading can be removed from the signal by despreading the signal using a replica of the pseudo random chip sequence. Chip timing synchronization between the replica pseudo random chip sequence and the signal can be obtained using correlation of the received signal. Data can be detected from the received signal after it has been despread, dehopped, and dechirped.

Figure 11:
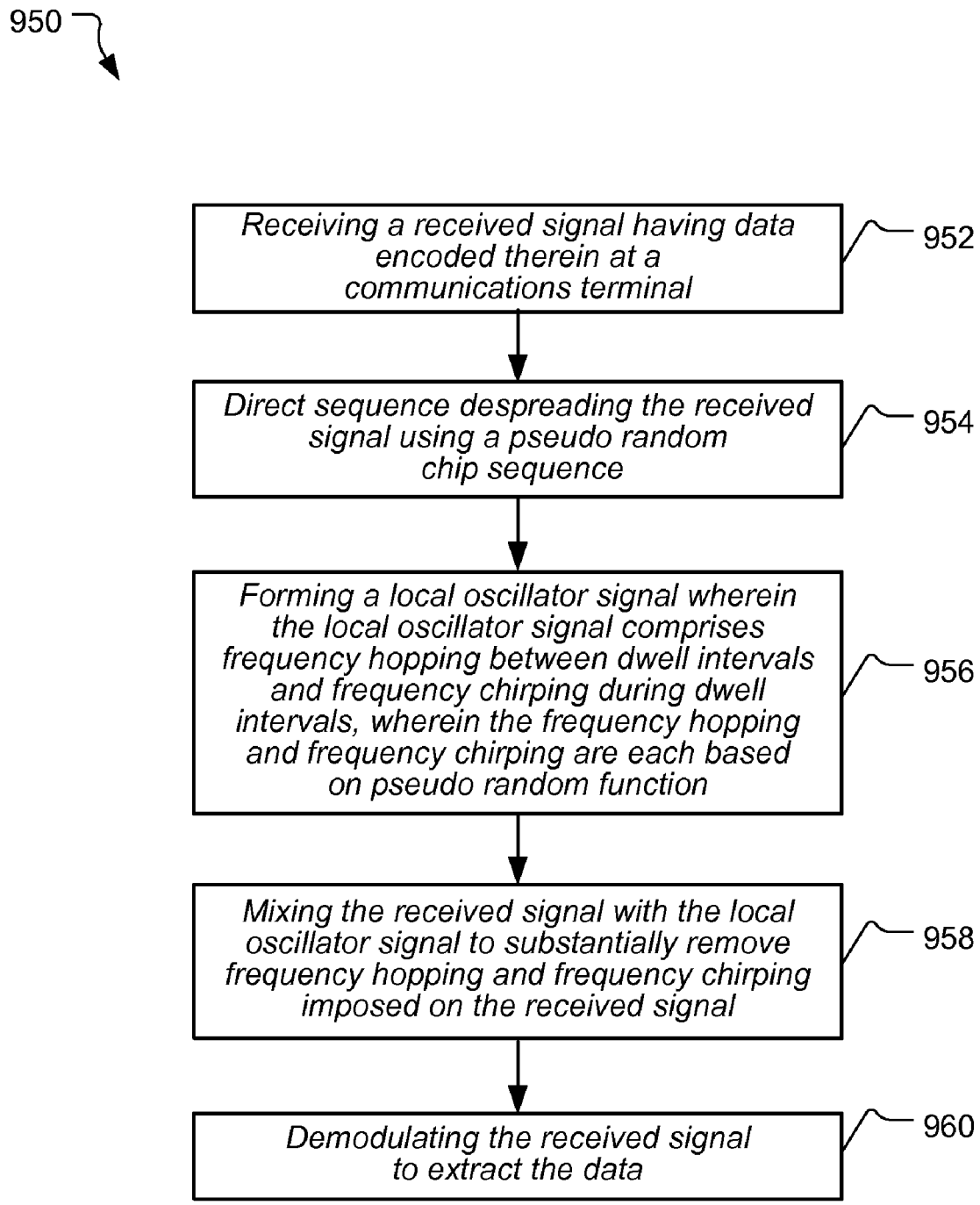
FIG. 11 is a flow chart of a method for reception of radio communication having decreased capability for detection of a communications system by an adversary in accordance with some embodiments of the present invention.

FIG. 11 illustrates a method for receiving a direct sequence spread and frequency hopped and chirped radio communications signal at a communications terminal. The communication terminal can, for example, include a receiver as described above. The method can be implemented in a communications terminal, for example, similarly to the method described above in reference to FIG. 10.

The radio communications signal can, for example, be generated by the method of FIG. 10, or generating using a transmitter as illustrated in FIG. 1 or FIG. 3. The method 950 can include receiving 952 a received signal having data encoded therein. For example, receiving can include collecting radio signal energy, downcoverting the radio signal, filtering, amplifying, and similar operations, for example, using antennas, downconverters, filters, amplifiers, and similar components.

The method 950 can also include direct sequence despreading 954 the received signal using a pseudo random chip sequence. Despreading can be performed by a despreader, a correlator, a mixer, or an exclusive-or gate, for example, as described above. The pseudo random chip sequence can be generated by a code generator and synchronized to the received signal as described above.

Another operation in the method 950 can be forming a local oscillator signal. The local oscillator signal can include frequency hopping between dwell intervals and frequency chirping during dwell intervals. The dwell intervals need not be constant length. The timing of the dwell intervals need not be synchronized to the timing of the direct sequence spreading. The frequency hopping, frequency chirping, and dwell interval length can also be based on a pseudo random function. For example, the pseudo random function can be a predefined function of time of day known to the transmitter and the receiver. Thus, the frequency local oscillator signal can substantially match the frequency of the receive signal (except for time synchronization errors, frequency reference errors, and the like). The local oscillator signal can, for example, be generated by a reference signal generator as described above. Various types of pseudo random chirp functions can be used, for example as described above.

The method 950 can include mixing 956 the received signal with the local oscillator signal to substantially remove the frequency hopping and frequency chirping imposed on the received signal. Mixing can be performed digitally, for example using s digital phase shifter, as described above. As another example, mixing can be performed using a multiplier.

Another operation in the method 950 can be demodulating 958 the received signal to extract the data. For example, demodulating can be performed using a demodulator, decoder, or both as described above.

The operations of the method 950 need not occur in the order listed. Thus, the received signal can be despread, and then dechirped and dehopped. Alternatively, the signal can be dechirped and dehopped first, and then despread. Chirping and hopping can occur simultaneously, for example, as described above. Alternatively, dechirping and dehopping can be performed separately. For example, frequency chirping can be removed in a digital domain using a digital phase shifter. Frequency hopping can then be removed in an analog domain using a reference signal generator and a mixer. Spreading can occur before or after frequency hopping and frequency chirping.

While a number of illustrative applications have been described, many other applications of the presently disclosed techniques may prove useful. Accordingly, the above-referenced arrangements are illustrative of some applications for the principles of the present invention. It will be apparent to those of ordinary skill in the art that numerous modifications can be made without departing from the principles and concepts of the invention as set forth in the claims.

The invention claimed is:

1. A method for radio communications having decreased capability for detection of communications signals by an adversary, the method comprising:
   transmitting a signal having data encoded therein from a communications terminal;
   chirping the signal during dwell intervals by changing the frequency of the signal using a pseudo random chirp function, wherein the frequency of the signal is changed in a substantially continuous manner during each dwell interval;
   hopping the signal between dwell intervals by changing the frequency of the signal using a pseudo random frequency selection, wherein the frequency of the signal is changed in a substantially discontinuous manner between dwell intervals; and
   direct sequence spreading the signal using a pseudo random chip sequence using a chip timing.

2. The method of claim 1, wherein the dwell intervals are defined by a first timing source and the chip timing is defined by a second timing source asynchronous to the first timing source.

3. The method of claim 2, wherein the first timing source is time of day and the second timing source is a free running clock disposed within the communications terminal.

4. The method of claim 1, wherein the pseudo random chirp function is a linear function having a slope, and the slope is pseudo randomly selected for each dwell interval.

5. The method of claim 1, wherein the pseudo random chirp function is a non-linear function having a parameter pseudo randomly selected for each dwell interval.

6. The method of claim 5, wherein the parameter comprises at least one derivative of the pseudo random chirp function.

7. The method of claim 1, wherein the dwell intervals each have a length and the length is pseudo randomly selected for each dwell interval.

8. The method of claim 1, further comprising:
   receiving the signal at a second communications terminal to form a received signal;
   substantially removing the frequency hopping and the frequency chirping from the received signal;
   correlating the received signal using a replica of the pseudo random chip sequence to determine receive chip timing.

9. The method of claim 8, further comprising:
   direct sequence despreading the received signal using the replica pseudo random chip sequence adjusted to the receive timing; and
   detecting data encoded in the received signal.

10. The method of claim 8, wherein the substantially removing the frequency hopping and the frequency chirping comprises:
    forming a local oscillator signal wherein the local oscillator signal comprises frequency hopping and frequency chipping derived using the pseudo random frequency selection and the pseudo random chirp function; and
    mixing the received signal with the local oscillator signal.

11. A method for receiving a direct sequence spread, frequency hopped and frequency chirped radio communications signal comprising:
    receiving a received signal having data encoded therein at a communications terminal;
    direct sequence despreading the received signal using a pseudo random chip sequence;
    forming a local oscillator signal wherein the local oscillator signal comprises frequency hopping between dwell intervals and frequency chirping during dwell intervals, wherein the frequency hopping and frequency chirping are each based on a pseudo random function;
    mixing the received signal with the local oscillator signal to substantially remove frequency hopping and frequency chirping imposed on the received signal; and
    demodulating the received signal to extract the data.

12. The method of claim 11, wherein forming a local oscillator signal comprises using a time of day timing source to drive the frequency hopping and the frequency chirping.

13. The method of claim 12, wherein the direct sequence despreading comprises using a correlator to determine chip timing.

14. The method of claim 11, wherein the pseudo random chirp function is a linear function, having a slope and the slope is pseudo randomly selected for each dwell interval.

15. The method of claim 11, wherein the pseudo random chirp function is a non-linear function having a parameter, and the parameter is pseudo randomly selected for each dwell interval.

16. The method of claim 15, wherein the parameter comprises at least one derivative of the pseudo random chirp function.

17. The method of claim 11, wherein the dwell intervals each have a length, and the length is pseudo randomly selected for each dwell interval.

18. A transmitter for transmitting a direct sequence frequency hopped chirped radio communications signal comprising:
    a modulator configured to modulate data onto a modulated signal;
    a reference signal generator configured to generate a reference signal comprising frequency hopping between dwell intervals and frequency chirping during dwell intervals, wherein the frequency hopping and frequency chirping are based on at least one pseudo random function;

a mixer coupled to the modulator and the reference signal generator and configured to mix the modulated signal with the reference signal to form a hopped, chirped signal having frequency hopping and frequency chirping; and a spreader coupled to the mixer and configured to direct sequence spread the hopped, chirped signal to form a transmitted signal.

19. The transmitter of claim 18, wherein the reference signal generator is tied to a time of day clock, and wherein the spreader is tied to a free running clock asynchronous to the time of day clock.

20. The transmitter of claim 18, wherein the frequency chirping is a linear function, and a slope of the frequency chirping is pseudo randomly selected each for dwell interval.

21. The transmitter of claim 18, wherein the frequency chirping is a nonlinear function, and a parameter of the nonlinear function is pseudo randomly selected for each dwell interval.

22. The transmitter of claim 21, wherein the parameter comprises at least one derivative of the frequency chirping.

23. The transmitter of claim 21, wherein the dwell intervals each have a length pseudo randomly selected for each dwell interval.

24. A receiver for receiving a direct sequence frequency hopped chirped communications radio signal comprising:

a despreader configured to despread a received signal to form a despread signal;

a reference signal generator configured to generate a reference signal comprising frequency hopping between dwell intervals and frequency chirping during dwell intervals, wherein the frequency hopping and frequency chirping are each based on at least one pseudo random function;

a mixer coupled to the despreader and the reference signal generator and configured to mix the despread signal with the reference signal to substantially remove frequency hopping and frequency chirping imposed on the received signal to form a dehopped signal; and a demodulator configured to demodulate data from the dehopped signal.

25. The receiver of claim 24, wherein the reference signal generator is tied to a time of day clock, and wherein the despreader is tied to a clock asynchronous to the time of day clock.

26. The receiver of claim 24, wherein the frequency chirping is a linear function, and a slope of the frequency chirping is pseudo randomly selected for each dwell interval.

27. The receiver of claim 24, wherein the frequency chirping is a nonlinear function, and a parameter of the frequency chirping is pseudo randomly selected for each dwell interval.

28. The receiver of claim 27, wherein the parameter comprises at least one derivative of the frequency chirping.

29. The receiver of claim 27, wherein the dwell intervals each have a length pseudo randomly selected for each dwell interval.

* * * * *